United States Patent
Yamaguchi et al.

(10) Patent No.: US 6,539,671 B2
(45) Date of Patent: Apr. 1, 2003

(54) AUTOMOTIVE WEATHER STRIP WITH EXTENDED BASE

(75) Inventors: Yuzuru Yamaguchi, Nishikasugai-gun (JP); Teruhito Goto, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/732,755

(22) Filed: Dec. 11, 2000

(65) Prior Publication Data

US 2001/0005960 A1 Jul. 5, 2001

(30) Foreign Application Priority Data

Dec. 10, 1999 (JP) ............................. 11-352323

(51) Int. Cl.7 ................................. E06B 7/22
(52) U.S. Cl. ................ 49/498.1; 49/495.1; 49/475.1
(58) Field of Search ..................... 49/498.1, 475.1, 49/493.1, 495.1

(56) References Cited

U.S. PATENT DOCUMENTS

| | | | |
|---|---|---|---|
| 4,858,385 A | * 8/1989 | Bright | ............... 49/490.1 |
| 4,884,370 A | 12/1989 | Nozaki et al. | |
| 5,154,952 A | 10/1992 | Nozaki | |
| 5,304,409 A | 4/1994 | Nozaki | |
| 5,356,194 A | * 10/1994 | Takeuchi | ............... 296/146.9 |
| 5,389,409 A | 2/1995 | Iwasa et al. | |
| 5,527,583 A | 6/1996 | Nozaki et al. | |
| 5,590,926 A | 1/1997 | Nozaki | |
| 5,693,419 A | 12/1997 | Nozaki | |
| 5,715,632 A | 2/1998 | Nozaki | |
| 5,791,722 A | 8/1998 | Nozaki et al. | |
| 5,852,898 A | 12/1998 | Hikosaka et al. | |
| 5,918,421 A | 7/1999 | Nozaki | |
| 6,012,760 A | 1/2000 | Nozaki | |
| 6,250,018 B1 | * 6/2001 | Kawai et al. | ............... 49/479.1 |

FOREIGN PATENT DOCUMENTS

| | | |
|---|---|---|
| JP | 1-168346 | 11/1989 |
| JP | 2-26934 | 2/1990 |

* cited by examiner

*Primary Examiner*—Gregory J. Strimbu
(74) *Attorney, Agent, or Firm*—Law Offices of David G. Posz

(57) ABSTRACT

An automotive weather strip, with an extended portion formed integrally with a base portion of the weather strip, is bonded with an attachment panel of a door frame by a double-sided adhesive tape. The extended portion is formed as a substantially flat plate, so that the extended portion can be pressed uniformly and quickly by a pressing jig. Thus, the weather strip can be bonded with the attachment panel easily. In addition, only one hollow portion is provided as a seal portion, so that the configuration of the weather strip can be made so simple that it is possible to connect extruded portions of the weather strip with molded portions easily.

5 Claims, 6 Drawing Sheets

AUTOMOTIVE WEATHER STRIP WITH EXTENDED BASE

BACKGROUND OF THE INVENTION

1. Field of the Invention

The present invention relates to an automotive weather strip, and particularly relates to a door weather strip which has an extruded portion made of rubber and a molded portion made of rubber or thermoplastic elastomer, and which is attached to a vehicle by a double-sided adhesive tape or a bonding agent.

The present application is based on Japanese Patent Application No. Hei. 11-352323, which is incorporated herein by reference.

2. Description of the Related Art

A conventional weather strip is attached to the circumferential place of a door of a vehicle so as to seal between the door and a door opening portion of a body which is a partner-side member. Straight-line portions of such a weather strip are formed by an extrusion molding method while corner portions thereof having a small curvature radius are formed by a molding method. (For example, see JP-U-1-168346, JP-U-2-26934, etc.)

A door weather strip will be described by way of example. The weather strip has a base portion to be attached to the circumferential place of a front door, and a hollow seal portion extending from the base portion. For example, the weather strip is made of EPDM solid rubber or sponge rubber.

FIG. 12 is a cross sectional view showing the configuration of a conventional weather strip for a front door. This weather strip 50 is bonded with the outer circumferential place of a door frame 12 through a double-sided adhesive tape 55 and clips (not shown). A seal portion 52 having a hollow portion 54 is formed integrally with a base portion 51 of the weather strip 50. The hollow portion 54 is pressed by a body-side member 26 at the circumferential place of a door opening portion so as to be deformed and squashed. Thus, sealing is attained between the door frame 12 and the body-side member 26. Further, hollow portion 53 is formed in the base portion 51 separately from hollow portion 54 of the seal portion 52. A seal lip 56 and a rear lip 57 are formed integrally with the car-exterior-side wall surface of the base portion 51 not only in order to prevent noise from being produced by the wind at the time of high-speed driving, but also in order to perform sub-sealing. Alternatively, a head portion of a clip (now shown) may be inserted into the hollow portion 53 from the back surface side of the base portion 51 so as to be locked therein. Then, the clip is engaged with an engagement hole formed in the door frame 12 so that the weather strip 50 is attached to the door frame 12.

In the weather strip 50 described above, the contact bonding of the double-sided adhesive tape 55 to the door frame 12 is achieved by pressing the seal portion 52 to thereby squash the two hollow portions 53 and 54. Accordingly, there is a problem that the work of bonding is very difficult and troublesome to do, and the pressing force is not transmitted sufficiently. Thus, it is difficult to ensure the adhesive strength.

In addition, the seal portion 52 is compressed by the body-side member 26 when the door is closed. Since sealing is attained by such a configuration, it is necessary to increase the rigidity of the root of the seal portion 52. It can be therefore considered that the base portion 51 is formed to be so thick and the root position of the seal portion 52 is made so high that the rigidity of the root of the seal portion 52 is increased. However, if the base portion 51 is made thick, the shape of the base portion 51 becomes unstable due to the imbalance in thickness with other portions at the time of molding operation. In addition, extra material is required. Further, because there is no portion into which the head portion of the clip is inserted and locked, it is necessary to provide the hollow portion 53 in the base portion 51 separately. Thus, there is a problem that the weather strip becomes complicated to manufacture. That is, in the process of extruding unvulcanized rubber for forming the weather strip 50, it is necessary to adjust the respective pressures of the hollow portion 53 and 54 having different sizes, separately from each other, when the shapes of the hollow portions 53 and 54 are stabilized while preventing the seal portion 52 from being deformed and squashed due to the difference in pressure between the hollow portions 53 and 54 and the atmosphere around them. Therefore, there occurs a problem that the work of the adjustment is difficult. Further, when the sectional configurations of the extruded portion becomes complicated, there is another problem that the structures of molds for molded portion for connecting the end portion of the extruded portion with each other also become complicated so that the productivity is lowered.

SUMMARY OF THE INVENTION

It is a first object of the present invention to solve the foregoing problems belonging to the background art, that is, to provide an automotive weather strip which can be accurately and easily bonded with, for example, an attachment member of a body-side member, a door frame, or the like, at the circumferential edge of an opening portion of a door by a double-sided adhesive tape or a bonding agent.

In addition to the first object, it is a second object of the present invention to provide an automotive weather strip with the productivity improved.

Further, in addition to the above objects, it is a third object of the present invention to provide an automotive weather strip in which the sealing performance can be made uniform all over the circumference of the automotive weather strip.

Further, it is a fourth object of the present invention to provide an automotive weather strip which can be manufactured easily and can be bonded with a door frame by a compact double-sided adhesive tape, and in which the sealing performance can be made uniform all over the circumference of the automotive weather strip.

In order to solve the above problems, there is provided an automotive weather strip comprising a base portion and a hollow seal portion projecting from the base portion, the automotive weather strip being interposed between a body-side member and a door frame so as to seal off the body-side member from the door frame; wherein a flat-plate-like extended portion is formed on at least one of opposite left and right sides of the base portion, and a back surface of the extended portion is designed to be able to be bonded with a door or a body by a double-sided adhesive tape or a bonding agent.

Only one hollow portion is preferably formed in the seal portion.

A seal lip is preferably formed as a sub-seal portion integrally with an outside portion of the extended portion.

The weather strip may be formed into an annulus which can be attached continuously to an outer circumference of a front or rear door; the weather strip is constituted by an upper extruded portion and a lower extruded portion; the upper extruded portion has a seal lip as a sub-seal while the lower extruded portion has no seal lip; and the upper and lower extruded portions are connected integrally with each other through at least one molded portion having one hollow portion.

A groove for receiving the double-sided adhesive tape is preferably formed in a back surface of the extended portion.

Further, there is provided an automotive door weather strip comprising a base portion and a hollow seal portion, the base portion being attached to an outer circumference of a door frame by a double-sided adhesive tape; wherein: the base portion is shaped into a flat plate; the seal portion projects from the base portion and has only one hollow portion.

The weather strip preferably includes an extruded portion and a molded portion, the extruded portion and the molded portion being connected integrally with each other, and a core drawing slit for forming a hollow portion in the molded portion is formed in a base portion of the molded portion.

Features and advantages of the invention will be evident from the following detailed description of the preferred embodiments described in conjunction with the attached drawings.

DETAILED DESCRIPTION OF THE PREFERRED EMBODIMENTS

An embodiment in which the present invention is carried out to from a door weather strip 11 (hereinafter simply referred to as "weather strip") to be mounted on the outer circumference of a front door of an automobile, will be described with reference to FIGS. 1 to 7.

Figure 3:
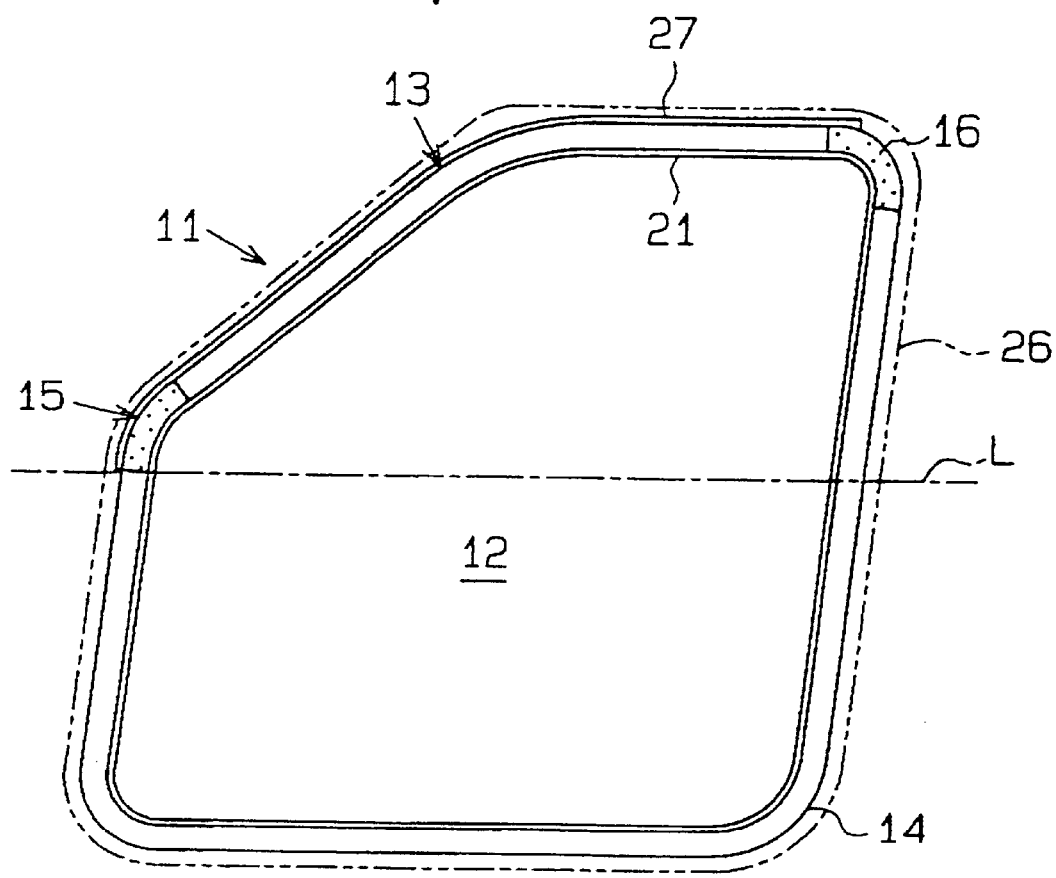
FIG. 3 is a schematic front view showing the whole of the weather strip.

The weather strip 11 schematically shown in FIG. 3 is mounted on the outer circumferential place of a door frame 12 of a right front door of the automobile. The weather strip 11 is formed into an annular shape as a whole. The weather strip 11 has an upper extruded portion 13 continuously formed by an extrusion molding method so as to be attached to the upper portion of the door frame 12, and a lower extruded portion 14 continuously formed by an extrusion molding method so as to be attached to the lower portion and the rear portion of the door frame 12. Further, the weather strip 11 has a front molded portion 15 to be attached to the front upper corner portion of the door frame 12, and a rear molded portion 16 to be attached to the rear upper corner portion of the door frame 12. The front molded portion 15 and the rear molded portion 16 connect the two end portions of the upper extruded portion 13 and the lower extruded portion 14 with each other, respectively.

In this embodiment, the weather, strip 11 is formed of sponge rubber of EPDM (ethylene-propylene-diene terpolymer).

Figure 1:
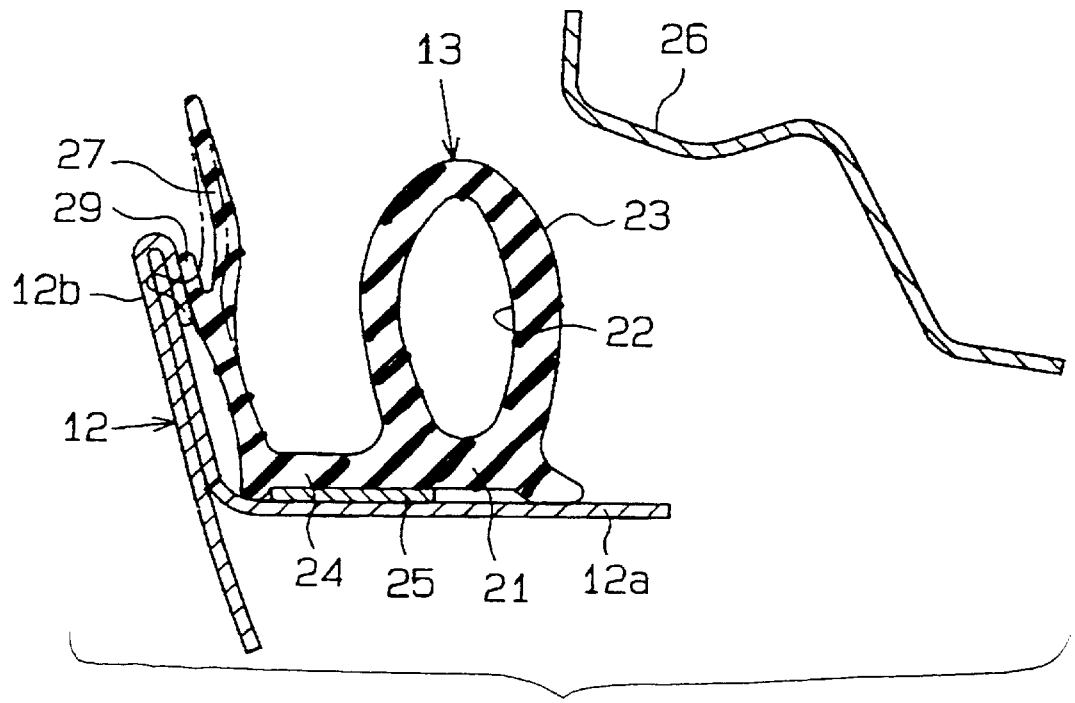
FIG. 1 is a cross-sectional view of a main portion of a weather strip for a front door according to an embodiment of the present invention when a door is open.

As shown in FIG. 1, the upper extruded portion 13 has a flat-plate-like base portion 21 to be attached to an attachment panel 12a of the door frame 12, a seal portion 23 extending outward from this base portion 21 and having a hollow portion 22, and a flat-plate-like extended portion 24 formed integrally with the outside portion of the base portion 21. The weather strip 11 is pressed on and bonded with the attachment panel 12a by a double-sided adhesive tape 25 which is provided on the back surface of the extended portion 24.

A seal lip 27 for sealing is formed integrally with the outside portion of the extended portion 24 so as to abut against the surface of a body-side member 26 which forms the circumferential place of a door opening portion of a body. Thus, a gap 28 formed between the door frame 12 and the body-side member 26 when the door is closed (see FIG. 2) is closed and sealed. In addition, when the automobile is driving, noise is prevented from being produced by the wind intruding into the gap 28. A back lip 29 is formed on the external surface of the seal lip 27 so as to abut against the inner surface of a flange panel 12b of the door frame 12 to provide sealing thereof.

Figure 4:
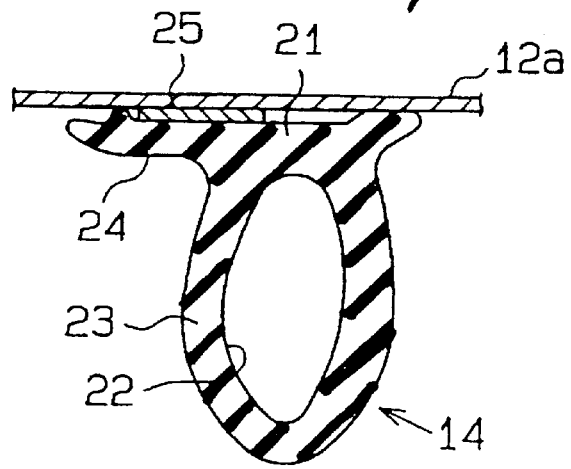
FIG. 4 is a cross-sectional view of a lower extruded portion of the weather strip of this embodiment.

As shown in FIG. 3, in the lower extruded portion 14, the gap 28 is formed under a belt line L or substantially perpendicularly to the driving direction of the automobile. Therefore, when the automobile is driving at a high speed, the wind hardly intrudes into the gap 28, or even if the wind intrudes into the gap 28, noise is not generated. Therefore, as shown in FIG. 4, the seal lip 27 and the back lip 29 formed in the upper extruded portion 13 are omitted in the lower extruded portion 14. Thus, the lower extruded portion 14 is constituted only by the base portion 21, the seal portion 23 and the extended portion 24.

Figure 5:
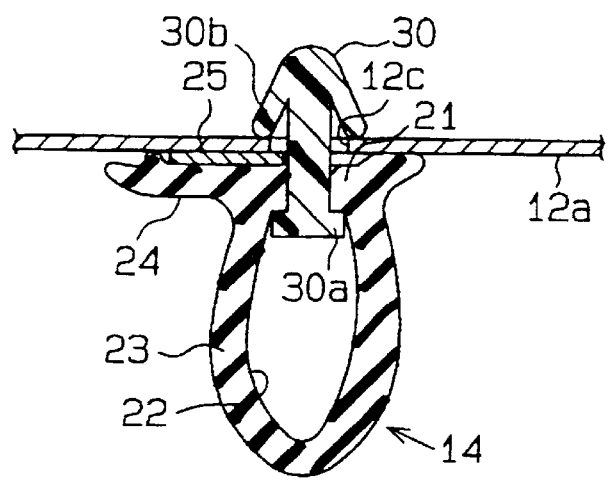
FIG. 5 is a cross-sectional view of the lower extruded portion at another point from FIG. 4 of the weather strip of this embodiment.

In addition, as shown in FIG. 5, a clip 30 for fixing the weather strip 11 to the door frame 12 is attached to the base portion 21 of the lower extruded portion 14. A head portion 30a of this clip 30 is inserted into the hollow portion 22 from the back surface side of the base portion 21 so as to be locked therein, while an anchor-like deformable lock leg 30b of the clip 30 is inserted into a lock hole 12c formed in the attachment panel 12a so as to be locked therein.

The sectional shape of the front molded portion 15 is basically the same as that of the upper extruded portion 13. This is also applied to the rear molded portion 16. Incidentally, in the rear molded portion 16, the seal lip 27 and the back lip 29 are formed only in the horizontal portion of the molded portion in the direction from its front end to its rear.

Figure 6:
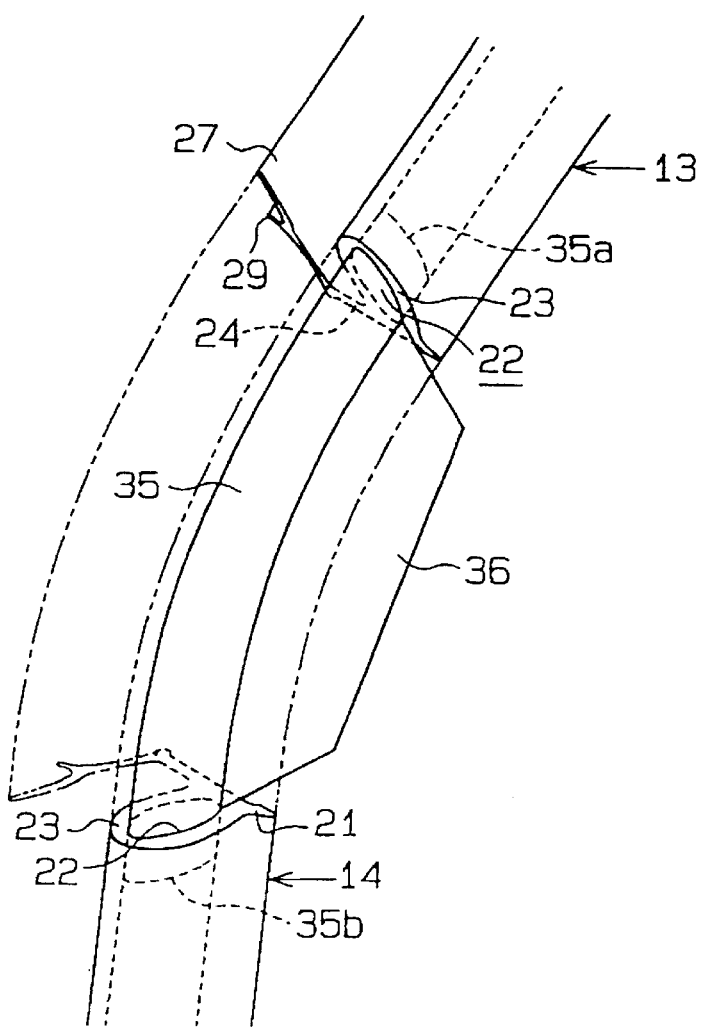
FIG. 6 is an enlarged perspective view of the vicinity of a front molded portion of the weather strip of this embodiment.

Next, the method of molding the front molded portion 15 and the rear molded portion 16 which are used to connect the upper extruded portion 13 with the lower extruded portion 14 will be described with reference to FIGS. 6 and 7.

Figure 7:
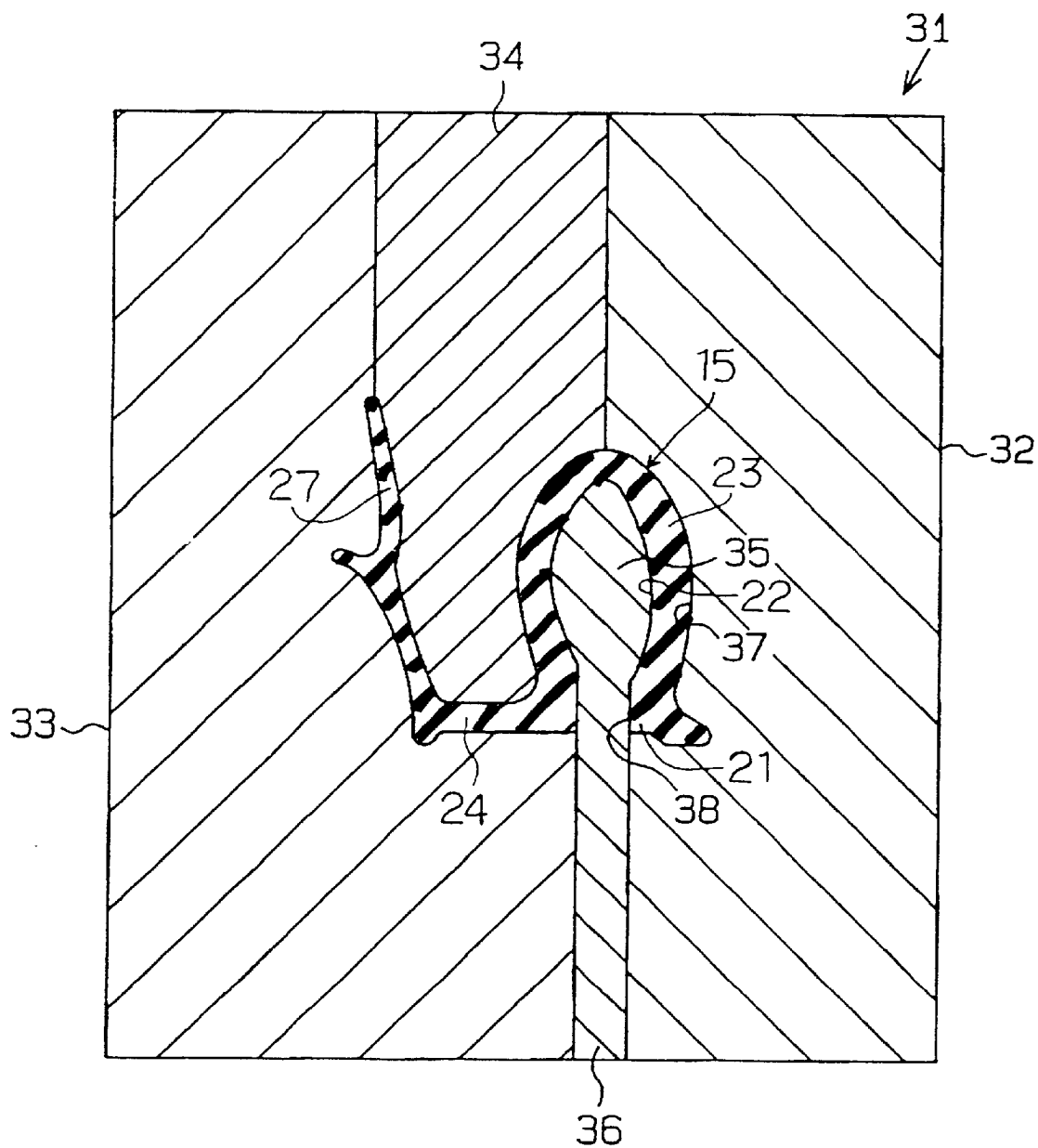
FIG. 7 is a sectional view showing a mold assembly.

As shown in FIG. 7, a mold assembly 31 to be used for molding the front molded portion 15 is constituted by a stationary mold 32, a first movable mold 33 provided correspondingly to this stationary mold 32, and a second movable mold 34 interposed between the stationary mold 32 and the first movable mold 33. The mold assembly 31 further has a hollow portion molding mold 35 as a core type mold, and a holder 36 for holding the hollow portion molding mold 35. The hollow portion molding mold 35 is inserted into a cavity 37 which is formed by the stationary mold 32, the first movable mold 33 and the second movable mold 34 so as to mold the hollow portion 22 of the front molding portion 15. As shown in FIG. 6, the hollow portion molding mold 35 is formed in to an arc. An upper end portion 35a of the hollow portion molding mold 35 is inserted into the hollow portion 22 at the front end of the upper extruded portion 13 formed in advance, while a lower end portion 35b of the hollow portion molding mold 35 is inserted into the hollow portion 22 in the front upper portion of the lower extruded portion 14. Then, as shown in FIG. 7, molding material such as EPDM sponge rubber, thermoplastic olefin elastomer, or the like, is charged into the cavity 37 formed by the mold assembly 31, so as to form the front molded portion 15.

The front molded portion 15 is released from the mold assembly 31 after it has been molded. A slit 38 for allowing the inside to communicate with the outside by the holder 36 is formed in the base portion 21 of the front molded portion 15. The hollow portion molding mold 35 is drawn out from the hollow portion 22 to the outside through this slit 38 by the holder 36. Then, the slit 38 is closed by a bonding agent such as cyanoacrylate or the like.

Incidentally, the rear molded portion 16 is molded in the same manner as the front molded portion 15.

Next, the effects of the weather strip 11 configured thus will be listed in connection with its configuration.

(1) In the aforementioned embodiment, the flat-plate-like extended portion 24 is formed integrally with a side portion of the flat-plate-like base portion 21, and the flat-plate-like extended portion 24 is pressed so that the weather strip 11 is bonded with the attachment panel 12a of the door frame 12 by the double-sided adhesive tape 25. Accordingly, the external surface of the flat-plate-like extended portion 24 is pressed by a not-shown pressing jig so that the double-sided adhesive tape 25 can adhere to the attachment panel 12a uniformly and quickly. Thus, it is possible to enhance the bonding strength, and it is possible to improve the efficiency in the work of attaching the weather strip 11 to the door frame 12.

(2) In the aforementioned embodiment, only one hollow portion 22 is formed in the seal portion 23 of the weather strip 11. Accordingly, the configuration is simplified so that extrusion molding and mold molding can be performed easily. It is therefore possible to reduce the manufacturing cost.

In addition, because the air is supplied into only one continuous hollow portion 22 when the weather strip 11 is extrusion-molding with unvulcanized rubber, the pressure balance between the hollow portion 22 and the atmosphere can be adjusted easily.

Figure 2:
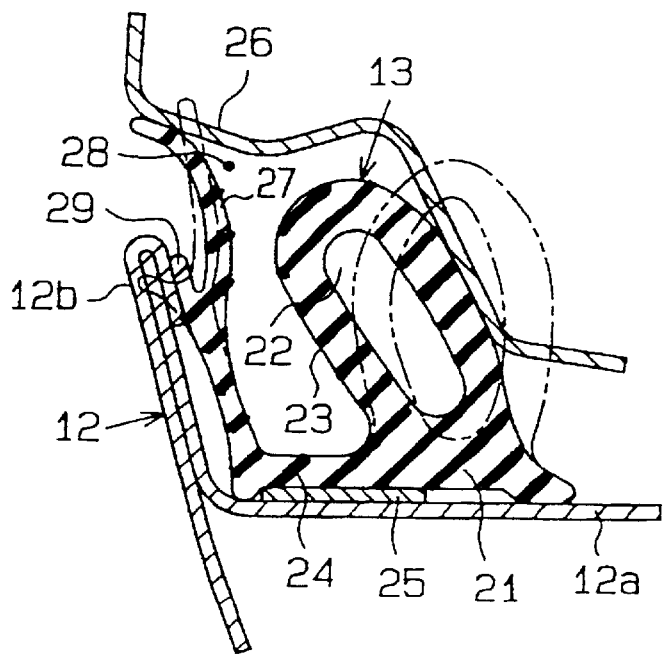
FIG. 2 is a cross-sectional view of the main portion of the weather strip of this embodiment when the door is closed.

(3) In the aforementioned embodiment, only one hollow portion 22 is formed in the ring-like seal portion 23 of the weather strip 11, and a side surface of the seal portion 23 abuts against the body-side member 26. As a result, the seal portion 23 is deformed to be bent in its root portion. Thus, as shown in FIG. 2, the sealing state of the seal portion 23 becomes uniform all over the circumference of the seal portion 23 when the door is closed. It is therefore possible to enhance the sealing performance.

Incidentally, in a conventional weather strip having two hollow portions, the mold structure for molding a molded portion becomes so complicated that the molded portion is molded by a mold for forming one hollow portion at one time. However, the molded portion having the rigidity lower than an extruded portion is apt to be deformed when the door is closed. Thus, the sealing performance cannot be made uniform. If two hollow portions were formed at one time in the molded portion in order to make the sealing performance uniform, the mold structure would be so complicated that the work of molding would be very troublesome, and the manufacturing cost could not be reduced. According to the aforementioned embodiment, such a problem can be solved.

(4) In the aforementioned embodiment, the extended portion 24 is formed between the seal portion 23 and the seal lip 27 of the weather strip 11. Accordingly, the extended portion 24 can be pressed easily by use of a space formed between the seal portion 23 and the seal lip 27.

(5) In the aforementioned embodiment, only one hollow portion 22 is formed in the base portion 21 and the seal portion 23. In addition, in the weather strip 11, the extruded portions 13 and 14 are connected integrally with the molded portions 15 and 16, and a slit 38 for drawing the hollow portion molding mold 35 for molding the molded portions are formed in the base portion 21 of each of the molded portions 15 and 16. As a result, the structure of the mold assembly 31 can be made so simple that the work of molding can be carried out easily. In addition, the weather strip 11 can be bonded with the door frame 12 by the compact double-sided adhesive tape 25, and the sealing performance can be made uniform all over the circumference of the weather strip when the door is closed.

Figure 8:
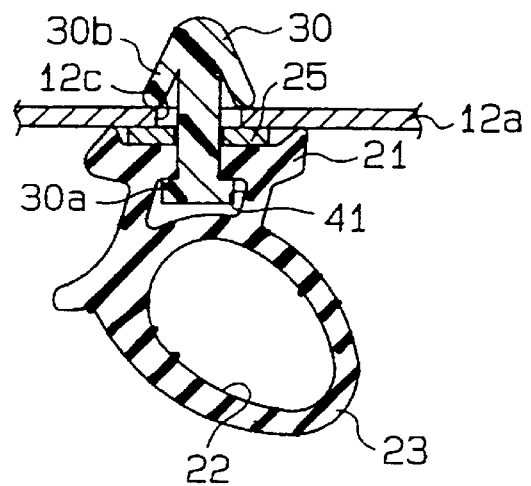
FIG. 8 is a cross-sectional view of a lower extruded portion showing a modification of the present invention.

As shown in FIG. 8, the lower extruded portion 14 may be designed to have a hollow portion 41 in the base portion 21 in the same manner as in the background art, and the base portion 21 may be attached to the door frame 12 with the clip 30. On the other hand, the upper extruded portion has only one hollow portion in the same manner as in the aforementioned embodiment. The upper extruded portion is provided with the extended portion 24 where the weather strip 11 is pressed to be bonded with the door frame 12 by the double-sided adhesive tape 25.

Figure 9:
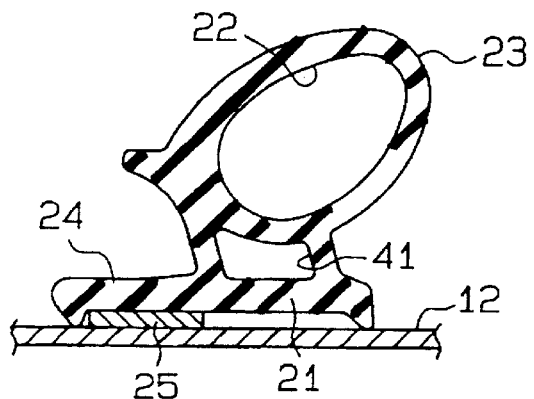
FIG. 9 is a cross-sectional view of an upper extruded portion showing a modification of the present invention.

As shown in FIG. 9, a flat-plate-like extended portion 24 may be formed integrally with the base portion 21 of the weather strip 11 having two hollow portions 22 and 41 so as to be disposed in a position which is away from the hollow portions 22 and 41. Thus, at the flat-plate-like extended portion 24, the weather strip 11 is bonded with the door frame 12 by the double-sided adhesive tape 25.

Figure 10:
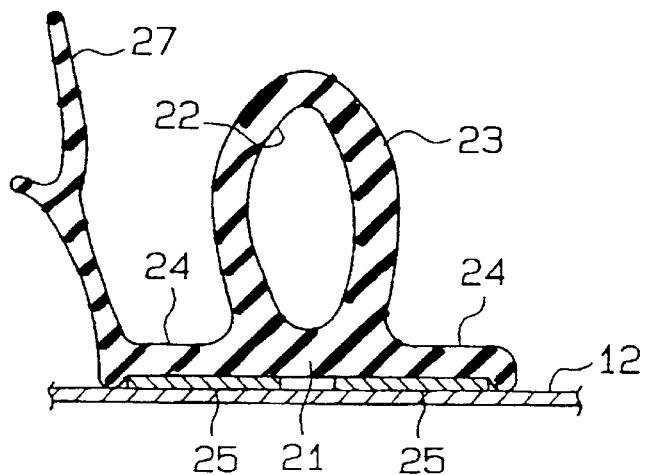
FIG. 10 is a cross-sectional view of an upper extruded portion showing another modification of the present invention.

As shown in FIG. 10, flat-plate-like extended portions 24 may be formed integrally with the opposite side portions of the flat-plate-like base portion 21 of each of the upper extruded portion 13 and the lower extruded portion 14. Thus, at the respective flat-plate-like extended portions 24, the weather strip 11 is bonded with the door frame 12 by the double-sided adhesive tape 25.

In this modification, the weather strip 11 can be bonded with the door frame 12 more firmly.

Figure 11:
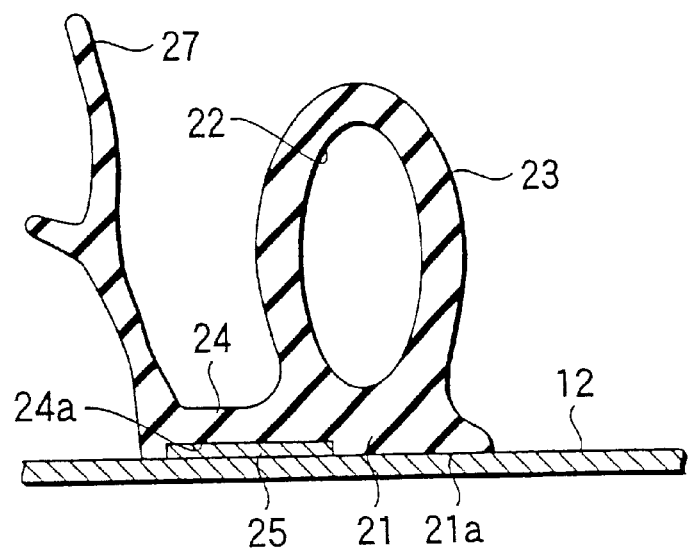
FIG. 11 is a cross-sectional view of an upper extruded portion showing a further modification of the present invention.
Figure 12:
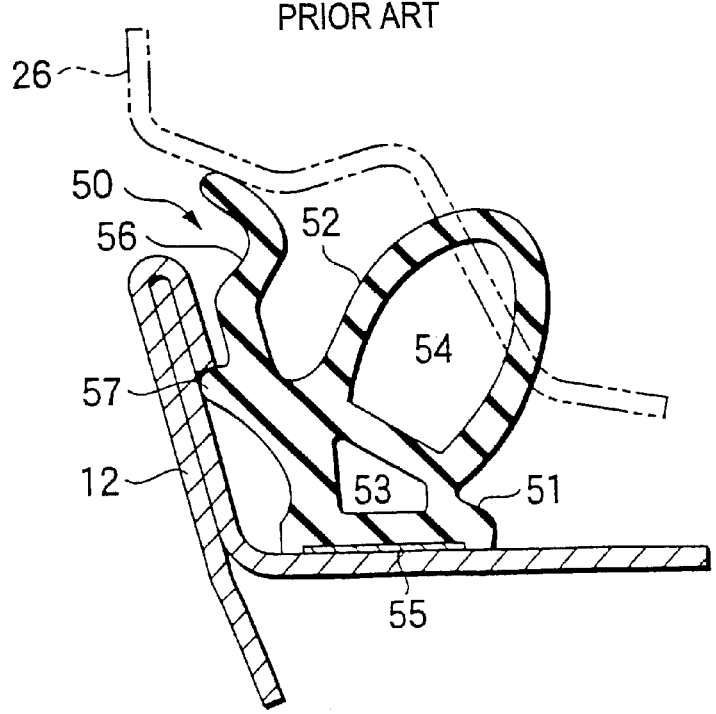
FIG. 12 is a cross-sectional view showing a conventional weather strip.

As shown in FIG. 11, a groove 24a for receiving the double-sided adhesive tape 25 may be formed in the back surface of the extended portion 24 so that a part of a back surface 21a of the base portion 21 abuts against the attachment panel 12a.

In this modification, the double-sided adhesive tape 25 is easy to be pasted onto the groove 24a in the back surface of the extended portions 24, and the attachment state of the base portion 21 and the seal portion 23 can be stabilized. In addition, because a part of the back surface 21a of the base portion 21 is made to abut against the attachment panel 12a, it is possible to enhance the sealing performance between the weather strip 11 and the attachment panel 12a.

Instead of forming the weather strip 11 of one kind of rubber (EPDM sponge rubber), for example, the front molded portion 15 and the rear molded portion 16 maybe formed of molding material such as EPDM solid rubber, thermoplastic elastomer, or the like.

The double-sided adhesive tape 25 may be large enough to cover the back surface of the base portion 21 and wide enough to be bonded with the attachment panel 12a.

For example, a bonding agent of a pressure-sensitive type or the like may be used in place of the double-sided adhesive tape 25.

The present invention maybe carried out as a weather strip for use in a rear door, or carried out as a weather strip which is a member for opening/closing an opening portion of a body other than a door.

The present invention may be carried out as a weather strip which is attached to a body-side member 26 at the circumferential place of an opening portion of a door.

As has been described above in detail, according to the present invention, the work of bonding a weather strip to an attachment member of a door frame of a door or to an attachment member of a body-side member at the circumferential place of an opening portion of a door etc. can be carried out easily and rapidly.

In addition to the aforementioned effect, molding at the time of extrusion molding can be carried out easily, and the work of molding molded portions can be carried out easily, because one hollow portion is formed in a seal portion.

In addition to the aforementioned effects, bonding between the seal portion and a seal lip is made so uniform that the bonding strength of the weather strip is improved. Further, the sealing effect of the weather strip can be improved by the seal lip.

In addition to the aforementioned effects, not only the sealing performance can be obtained uniformly all over the circumference of the weather strip, but also the structure of a mold for molding molded portions for connecting extruded portions can be made so simple that the work of molding can be carried out easily. This is because the weather strip is formed into a ring which can be attached continuously to the outer circumference of the door and the weather strip as a whole is constituted by the seal portion having one hollow portion.

In addition to the aforementioned effects, a double-sided adhesive tape can be pasted onto the back surface of an extended portion easily and quickly. Thus, the weather strip can be bonded with and held on the door frame and the body-side member stably.

Further, the weather strip according to the present invention can be manufactured easily and bonded with the door frame by a compact double-sided adhesive tape. In addition, the sealing performance can be made uniform all over the circumference of the weather strip when the door is closed.

In addition to the aforementioned effect, the structure of a mold for molding can be made so simple that the work of molding can be carried out easily.

This invention is not limited to the aforementioned description of the mode for carrying out the invention and the embodiments thereof at all, and includes various modifications that can be conceived by those skilled in the art without departing from the scope of claim for a patent.

What is claimed is:

1. An automotive door weather strip, said automotive weather strip being interposable between a body and a door frame so as to seal off said body from said door frame, said weather strip being formed into an annulus attachable continuously to an outer circumference of said door frame, said weather strip having an upper extruded portion, a lower extruded portion and at least one molded portion which integrally connects said upper and lower extruded portions, wherein said upper extruded portion comprises:
a first base portion mountable on said door frame, said first base portion being flat plate shaped;
a hollow seal portion projecting from said first base portion, and having only one hollow portion therein; and
an extended portion being formed on at least one of opposite sides of said first base portion, a back surface of said extended portion being bondable on said door frame through a double-sided adhesive tape, a front surface opposite said back surface being substantially flat, wherein said extended portion is disposable at an exterior side of the body, said extended portion being only made on said upper extruded portion; and wherein said molded portion comprises:
a second base portion mountable on said door frame; and
a hollow seal portion projecting from said second base portion; and wherein said lower extruded portion comprises:
a third base portion mountable on said door frame; and
a hollow seal portion projecting from said third base portion; and wherein said lower extruded portion of said weather strip is attachable to said door frame with a clip, said clip being attached to said third base portion from a back surface of said third base portion so as to be locked therein, while an anchor deformable lock leg of said clip is insertable into a lock hole in said door frame so as to be locked therein.

2. An automotive door weather strip according to claim 1, further comprising a groove for receiving said double-sided adhesive tape and being formed on the back surface of said extended portion.

3. An automotive door weather strip according to claim 1, further comprising a seal lip integrally formed at an outside portion of said extended portion.

4. An automotive door weather strip according to claim 1, further comprising a fourth hollow portion formed in said third base portion of said lower extruded portion of said weather strip,
wherein a head of said clip is inserted into said fourth hollow portion from the back surface of said third base portion of said lower extruded portion so as to be locked therein.

5. An automotive door weather strip according to claim 1, further comprising a core drawing slit for forming the hollow portion in said molded portion being formed in said second base portion of said molded portion.

\* \* \* \* \*